United States Patent [19]
Kuffer

[11] 3,961,179
[45] June 1, 1976

[54] BEAM DIRECTING SYSTEM HAVING A MOVEABLE LOW MASS INERTIA BEAM FOLDING OPTICAL ELEMENT

[75] Inventor: Fernand Bannie Kuffer, Brea, Calif.

[73] Assignee: General Dynamics Corporation, Pomona, Calif.

[22] Filed: Feb. 7, 1975

[21] Appl. No.: 547,901

[52] U.S. Cl. .......................... 250/203 R; 250/234; 350/55
[51] Int. Cl.² ........................................ G01J 1/20
[58] Field of Search ............. 250/203 R, 234; 350/6, 350/7, 16, 55

[56] References Cited
UNITED STATES PATENTS

| | | | |
|---|---|---|---|
| 3,446,980 | 5/1969 | Meier | 350/16 X |
| 3,644,043 | 2/1972 | Jones et al. | 250/203 R X |
| 3,647,276 | 3/1972 | Howell et al. | 250/203 R X |
| 3,899,145 | 8/1975 | Stephenson | 350/6 X |

*Primary Examiner*—Eugene La Roche
*Attorney, Agent, or Firm*—Neil F. Martin; Edward B. Johnson

[57] ABSTRACT

A low mass inertia scanning system is used in conjunction with a servo control system to make high frequency changes in beam direction. The scanning system is placed behind a beam expansion optical system, which reduces the mass-inertia and increases its directional accuracy. When used in the reverse direction, with beam reduction, it can be used to increase the directional movement. A beam scanning system, refractive or reflective, diverts the ray direction from or toward the primary optical axis. A beam expander, a telescope in reverse, projects the beam, for instance, to a moving target.. Alternately if the source-director-telescope is moving, it can keep the beam on a stationary or moving target. The beam direction or image is maintained in the same position, irrespective of source-director-telescope or target movement, by means of a sensing device and a servo system which appropriately adjusts the position of the scanning system (director) to accommodate such position change.

8 Claims, 6 Drawing Figures

3,961,179

BEAM DIRECTING SYSTEM HAVING A MOVEABLE LOW MASS INERTIA BEAM FOLDING OPTICAL ELEMENT

BACKGROUND OF THE INVENTION

The present invention relates to an optical scanning system of relatively low mass-inertia adapted to direct radiation beams from a fixed or moving source to form an image or spot at a fixed or desired moving position.

Many attempts have been made to provide optical devices which compensate for positional changes. These systems direct the entire assembly which includes the larger mass-inertia of the telescope. This limits the system frequency response due to power limits on the drive systems, stress levels in the structure, vibration modes and component deformation under accelleration. Other systems for image stabilization such as using gyro control to manipulate a pair of liquid lenses are generally cumbersome and complex.

In practical application, servo scanning systems generally receive radiation energy from a device such as an airplane, ship or other moving objects. The system responds to this energy and produces a local indication from which the position of the object may be determined. Through a suitable servo mechanism, a gun, searchlight or other device may be trained on the object at all times. Such systems are also applicable to signalling systems between ships at sea. In this application, the system must compensate for the relative movement of the two vessels.

A further application of these systems is the continuous scanning of a radiation source as the radiation emitted from a projectile or missile. Since the projectile is moving, it is necessary for the optical system to compensate for its changed position and continuously redirect the image of the projectile to a fixed position. Telescopes are ordinarily employed for this purpose and a servo system which senses the changes in position of the projectile controls the optics of the telescope to accommodate for such position change. Most present accurate art telescopes are quite large and cumbersome, weighing on the order of 4,000 pounds, and therefore have an extremely large inertias, somewhere in the order of 600 ft/lbs/sec$^2$. To control such a telescope, the servo system must be quite large and high powered. This requirement results in a system less sensitive than that often required.

SUMMARY OF THE INVENTION

It is the primary object of the present invention to provide an optical system for high frequency scanning or correction of placement of a beam for a receiver through beam expansion or contraction optics.

Another object is provision of a system which scans the beam over a fixed or moving receiver with a fixed or moving source with high frequency and accurate correction.

A further object of the present invention is provision of an optical system which places the beam or image on a particular location of a fixed or moving receiver with high frequency and accurate correction.

Still another object of the present invention is provision of an optical system which may be controlled by a relatively small servo motor to accurately compensate for high frequency movement of source or receiver or both.

Yet another object of the instant invention is to provide an optical system with the capability of multidimensional image or beam placement and/or scanning.

The optical system encompassing the instant invention comprises a beam director means behind the secondary optical element of a magnifying or minifying telescope. The beam director means is moveable about two axes. The telescope expands or contracts the beam and its directions. A suitable detector of beam location or scanning may be video tube, photomultiplier, infrared, radio detector or microphones. The signals from these are used to control a servo system, electrical, hydraulic or pneumatic which changes the direction of the deflection system to place the beam properly for the particular application.

The apparatus may be used in the reverse beam direction in those cases where increased movement is desired.

The above and other objects of the instant invention will become apparent as the description continues, and when read in conjunction with the appended drawings.

DETAILED DESCRIPTION OF THE DRAWINGS

Figure 1:
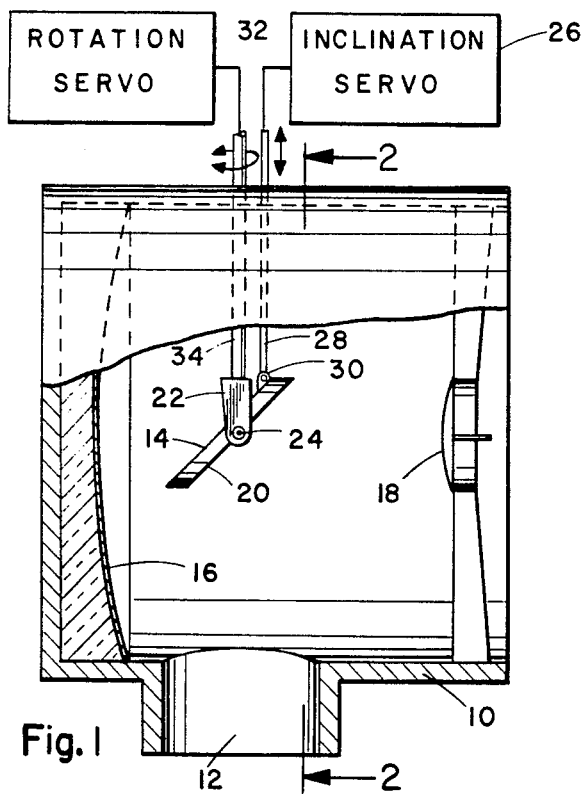
FIG. 1 is a side elevation view, partially cut away, of a typical telescope unit incorporating a movable beam director member such as a planar mirror, for example.

Referring to FIG. 1, a modified Cassegrainian telescope with an unperforated primary is illustrated. The primary optical components of the telescope are enclosed in the casing 10 which includes an access aperture 12. A beam director member, such as a diagonal planar reflector 14, incorporates a reflective surface 20 to provide beam directing, that is, angular reflection (without significant distortion). The reflective surface 20 may be contoured to compensate for aberration and also may be curved with surfaces such as toroidal, spherical, or off-axis aspherics, for example.

A focusable primary optical member, such as a concave reflector 16, and a focusable secondary optical member, such as a convex reflector 18, are disposed on opposite sides of the beam director member, which is a planar reflector 14, in this instance. The optical system can function with several combinations of curvilinear reflectors. For instance, in one configuration, the primary optical member reflector 16, may be elliptical-concave and the secondary optical member, reflector 18, may be spherical. Another configuration may utilize a parabolic primary reflector and a hyperbolic secondary reflector. The optical system can also function with refractive lenses or a combination of reflective and refractive lenses. Although the beam director member 14 is shown and described as being substantially centrally positioned within the casing 10 and between the primary optical member 16 and the secondary optical member 18, the beam director member 14 may be disposed in other positions. For example, beam director member 14 may be positioned on the opposite side of optical member 16. In addition, optical member 16 may be a short focal length lens and optical member 18 may be an objective or long focal length lens.

Figure 2:
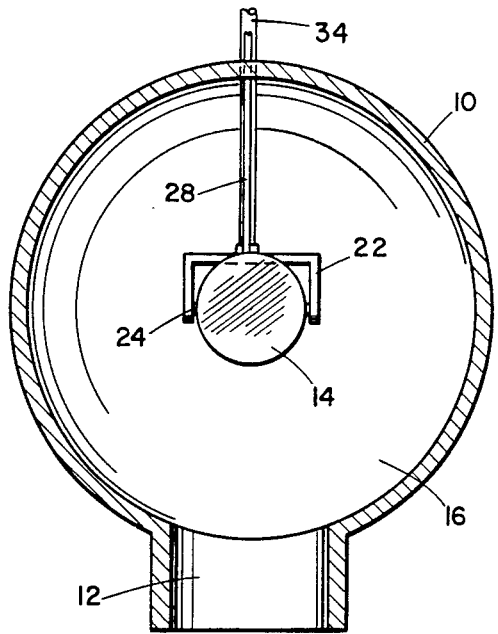
FIG. 2 is a sectional view taken along line 2—2 of FIG. 1.

As shown in FIG. 2, the beam director member, for example, planar reflector 14, is pivotally held by the bracket 22 via pins 24. The pins 24 permit the beam director member 14 to be pivoted about the inclination axis by means of the inclination servo 26. The inclination servo 26 includes a shaft 28. The shaft 28 is pinned to a bracket 30 on the back side of the beam director member 14. Shaft 28 is driven in linear reciprocal motion by servo 26 and therefore functions to tilt the planar reflector 14 about the inclination axis through pins 24.

A rotation servo means 32 rotates a shaft 34 about the longitudinal rotation axis of the shaft. The rotation of shaft 34 produces rotation of the beam director member 14 about the same rotation axis. Therefore, the beam director member 14 is driven in two motions, pivotal and rotational. Since the beam director member 14 and the associated motion producing shafts 28 and 34 can be of low mass construction, very sensitive servos can be utilized. Such servos are responsive over a range that includes all the frequencies that are normally encountered. Since in this case, the beam director is behind the magnification of the telescope, the beam direction is reduced by that ratio. Thus the relatively small mirror may be driven with lower accuracy requirements than is required where an entire telescopic optical system must be swiveled to scan or illuminate a moving object. The mass that must be controlled by the servos is reduced, on the order of 160:1 in a representative case.

Figure 3:
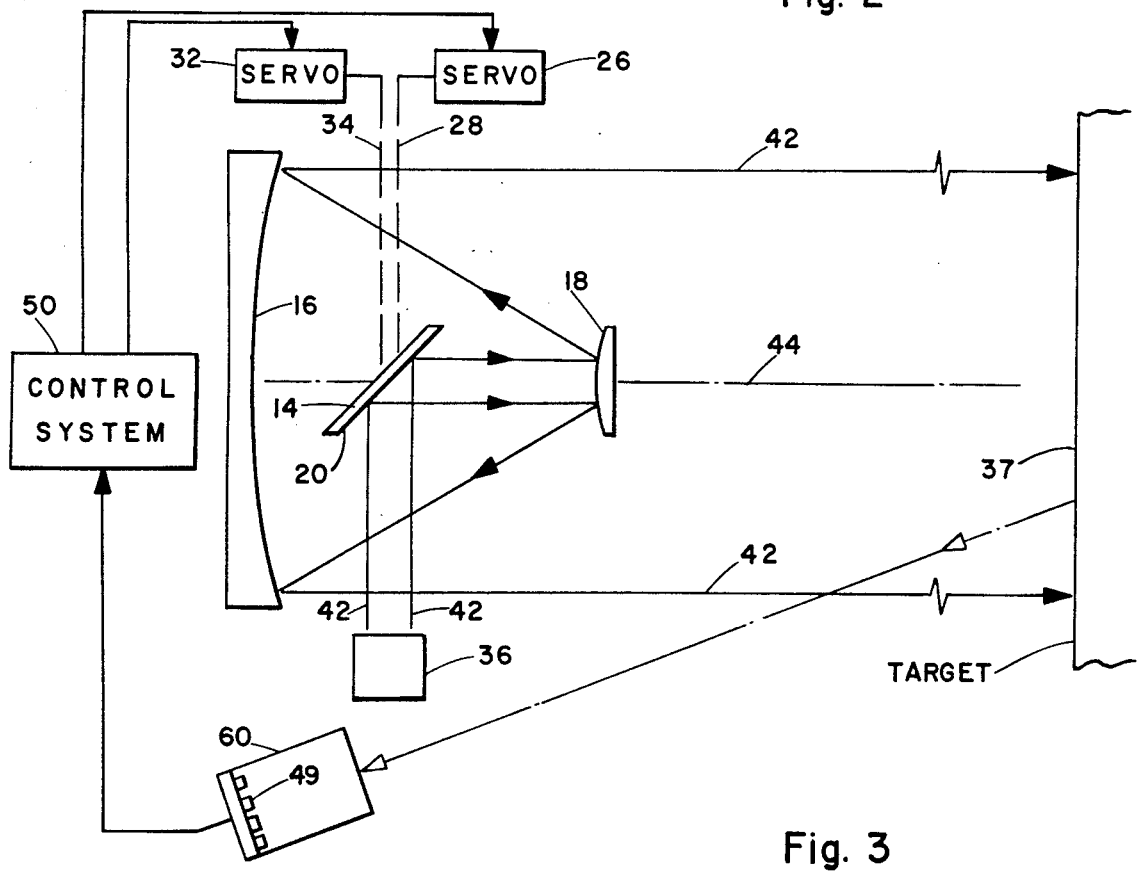
FIG. 3 is a diagram of the optical system as used in a target illuminating and tracking configuration.

FIG. 3 illustrates the path of rays 42 from the illumination source 36 to illuminate a target 37. The beam director member, planar reflector 14, for example, reflects the beam generally parallel to the optic axis 44 to the secondary optical member, convex reflector 18, in this instance. Reflector 18 diverges the rays to the primary optical member, concave reflector 16, in this example. The primary optical member 16, returns the rays generally parallel or converging returning again along the optic axis. In this case, the exiting rays 42 are at right angles to the source and expanded by the ratio of the secondary to primary's focal lengths. The target reflects a certain amount of illumination back to the tracker 60, the sensor 49 of which determine the target position change by appropriate signals. The control system 50 responds to the sensor 49 signals and converts them to rotational and pivotal positions of the beam director member 14.

Thus, the orientation of the beam director member 14, is adjusted so that the outgoing beams 42 always fall on the moving target.

Figure 4:
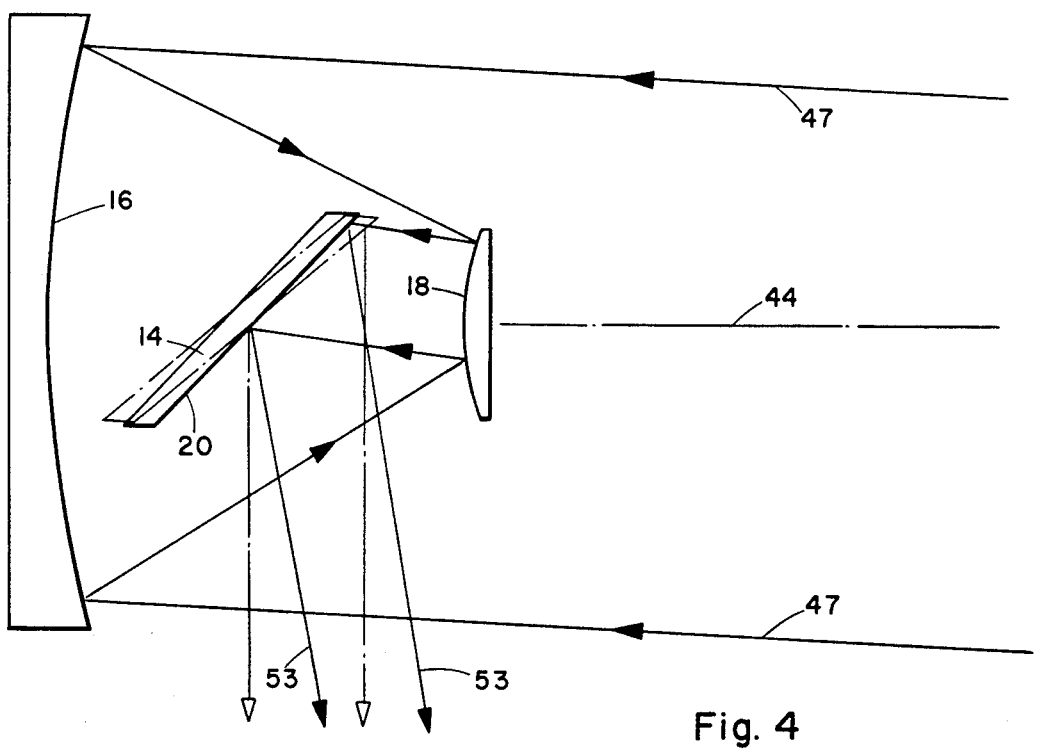
FIG. 4 is a diagram showing an off-set beam path and the compensating adjustment of the beam director member.

FIG. 4, illustrates reflected rays 47 from a target (not shown) received at a slight angle to the primary optic axis 44. The solid line representation of the beam director member 14 indicates the uncompensated position of that reflector. The resultant emerging rays 53 are shown to be in a non-perpendicular relationship to the primary optic axis 44. For the system to continuously scan the target, either for illumination or tracking purposes, it is necessary to adjust the position of the beam director member 14 to accommodate for the off-set rays 47. The dashed line representation of the beam director 14 illustrates the compensated position which is affected by the sensors 46 transmitting the target position to the central system 50 which commands the servos 32 and 36 to continually adjust the position of the beam director 14.

Figure 5:
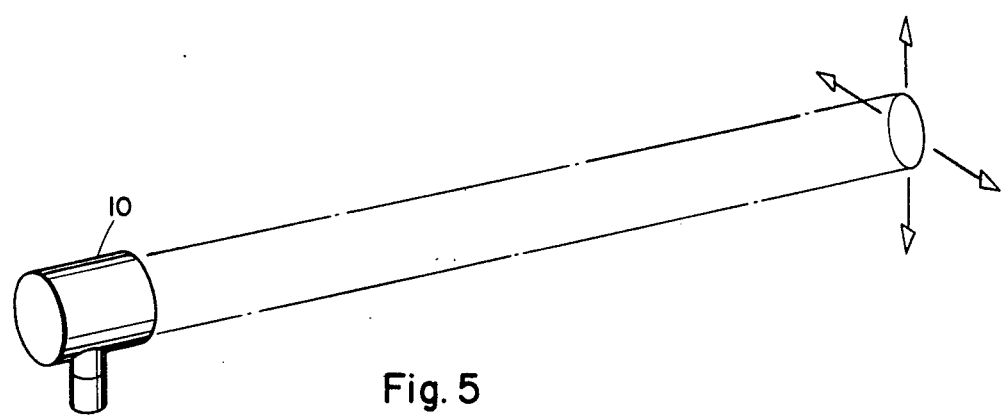
FIG. 5 illustrates the possible motion of an outgoing beam from a fixed telescope unit.

FIG. 5 illustrates by means of arrows, the ability of the illuminating source to be aimed to accommodate target motion in a two directional case.

Figure 6:
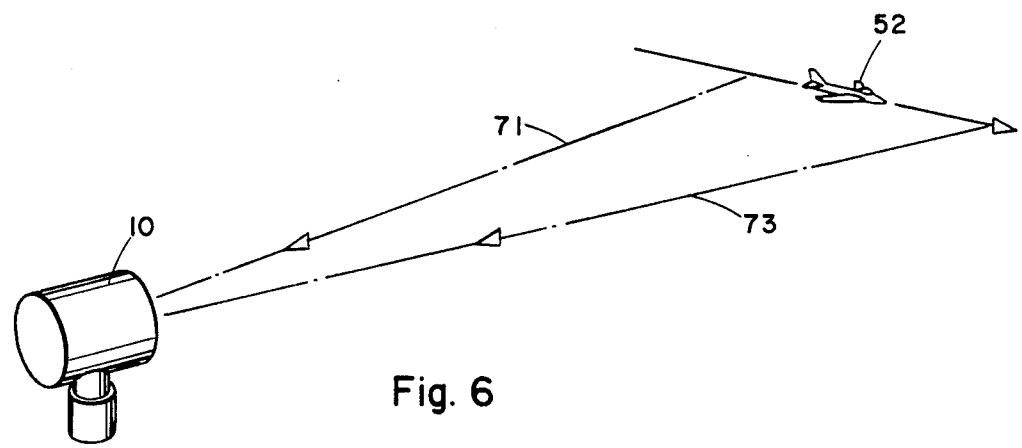
FIG. 6 illustrates target tracking from a fixed telescope unit.

In FIG. 6, the target is shown as an aircraft 52 which has a constantly changing position with respect to the system. A beam 71 represents the position of the aircraft 52 at one point in time and a beam 73 represents the position of the aircraft 52 at another point in time. The servos 32 and 36 scan the beam director 14 under control of the sensors 48 through the control system 50, as required to maintain the illuminating beams on target.

The end result to be obtained by the previously described apparatus is movement of a relatively small mirror, as opposed to movement of a very large and unwieldy telescope. The reduction in size is in a ratio equal to the angular magnification of the telescope. The accuracy requirements are reduced by a ratio equal to the angular magnification in the horizontal plane and half of the angular magnification in the vertical plane. The mass is reduced by at least the square of the magnification ratio. A further advantage of this system is that a less accurate servo system can be utilized.

As an example, a telescope with an angular magnification of 6 is chosen. A case with an aperture of about 30 inches has a mass of approximately 4,000 pounds with an inertia of 600 ft/lbs/sec$^2$. The diagonal assembly for such a system is five inches and it weighs about 25 pounds, having an inertia of 0.1 ft/lbs/sec$^2$. This changes the frequency response from approximately 10 hertz to about 40 hertz depending upon motor capabilities, for example. The net effect is to increase the servo frequency response and reduce the accuracy requirement of the directing assembly.

Modifications and adaptations in the method and materials of fabrication in the configuration and assemblage of the constituent elements are readily permissible within the scope of the instant invention, which changes are intended to be embraced therewithin.

Having described my invention, I now claim:

1. A low mass inertia optical system for accurately directing a radiation beam in a given direction which comprises:

optical beam folding means for diverting and folding incident radiation beams about a primary optic axis of the system, said means including a secondary optical member disposed generally perpendicular to said primary optic axis and operative to divert incoming radiation beams to generally parallel to said primary optic axis and outgoing radiation beams away from said primary optic axis, a primary optical member disposed generally perpendicular to said primary optic axis and in a radiation beam exchanging relation with respect to said secondary optical member and operative to divert incoming radiation beams toward said secondary optical member and outgoing radiation beams to generally parallel to said primary optic axis, and a beam director member mounted for pivotal and rotational movement about associated axes to accommodate radiation beam direction changes, said beam director is disposed between said primary and secondary optical members in a radiation beam exchanging relationship with said secondary optical member to fold incoming and outgoing radiation beams, said beam director is adapted to divert outgoing radiation beams parallel to said primary optical axis for interception by said secondary optical member, and said beam director member diverting incoming radiation beams to generally perpendicular to said primary optical axis.

2. The optical system of claim 1 wherein:

said beam director includes a reflective face, said secondary optical member is disposed forward of said reflective face in a radiation beam exchanging relationship, and said primary optical member is disposed aft of said reflective face in a non-radiation exchanging relationship with said reflective face, whereby incoming and outgoing radiation beams are folded about said beam director member.

3. The apparatus as recited in claim 1, wherein:
said primary optical member is concave and hyperbolic and said secondary optical member is convex and spherical.

4. The apparatus as recited in claim 1, wherein:
said primary optical member is concave and parabolic and said secondary optical member is convex and hyperbolic.

5. The apparatus as recited in claim 1, wherein:
said primary and secondary optical members are reflective elements.

6. The optical system according to claim 1 including:
sensor means adapted to monitor a change in position of incoming radiation from a target.

7. The optical system recited in claim 6 wherein:
servo means is responsive to position changes in the radiation monitored by said sensor means and is adapted to alter the tilt of said beam director member to compensate for changes in position of the radiation beam, whereby that beam is continuously redirected.

8. In the optical system of claim 7, wherein:
said servo means comprises an inclination servo means and a rotation servo means.

* * * * *